United States Patent
Yin et al.

(10) Patent No.: US 12,482,082 B2
(45) Date of Patent: Nov. 25, 2025

(54) SYSTEMS AND METHODS FOR GENERATING ENHANCED OPTHALMIC IMAGES

(71) Applicant: Alcon Inc., Fribourg (CH)

(72) Inventors: Lu Yin, Keller, TX (US); Ramesh Sarangapani, Coppell, TX (US)

(73) Assignee: Alcon Inc., Fribourg (CH)

( * ) Notice: Subject to any disclaimer, the term of this patent is extended or adjusted under 35 U.S.C. 154(b) by 668 days.

(21) Appl. No.: 17/880,427

(22) Filed: Aug. 3, 2022

(65) Prior Publication Data
US 2023/0054129 A1 Feb. 23, 2023

Related U.S. Application Data

(60) Provisional application No. 63/234,959, filed on Aug. 19, 2021.

(51) Int. Cl.
| | |
|---|---|
| G06T 5/92 | (2024.01) |
| A61B 3/12 | (2006.01) |
| A61B 3/14 | (2006.01) |
| G06T 5/50 | (2006.01) |
| G06T 7/11 | (2017.01) |
| G06T 7/12 | (2017.01) |
| G06T 7/70 | (2017.01) |

(52) U.S. Cl.
CPC .............. *G06T 5/92* (2024.01); *A61B 3/12* (2013.01); *A61B 3/14* (2013.01); *G06T 5/50* (2013.01);

(Continued)

(58) Field of Classification Search
CPC ..... G06T 5/92; G06T 5/50; G06T 7/11; G06T 7/12; G06T 7/70; G06T 2207/10016;
(Continued)

(56) References Cited

U.S. PATENT DOCUMENTS

| | | | |
|---|---|---|---|
| 7,421,102 B2 * | 9/2008 | Wetzel | G06V 20/69 382/128 |
| 8,068,988 B2 * | 11/2011 | Gholap | G06V 20/69 702/19 |

(Continued)

OTHER PUBLICATIONS

Chow C K, et al., Automatic boundary detection of the left ventricle from cineangiograms, Computers and Biomedical Research, Academic Press, Aug. 1, 1972, 388-410, 5: 4, London, GB.

(Continued)

*Primary Examiner* — Chan S Park

(57) ABSTRACT

Certain aspects of the present disclosure provide an ophthalmic imaging device for enhancing images. The device comprises an image capture component configured to generate an image stream comprising a first frame preceding a second frame, both capturing a branch of veins in an eye. The device further comprises an image processor configured to calculate first order statistics for a plurality of blocks for the first frame and to interpolate first order statistics for the first frame based at least in part on the branch of veins. The image processor is also configured to generate a tone mapping function and calculate tone mapping values for individual pixels of the second frame based on the tone mapping function. The image processor is additionally configured to generate an enhanced frame based on the calculated tone mapping values for individual pixels of the second frame to the pixels of the second frame.

16 Claims, 8 Drawing Sheets

(52) U.S. Cl.
CPC ............... *G06T 7/11* (2017.01); *G06T 7/12* (2017.01); *G06T 7/70* (2017.01); *G06T 2207/10016* (2013.01); *G06T 2207/10024* (2013.01); *G06T 2207/20021* (2013.01); *G06T 2207/20208* (2013.01); *G06T 2207/20212* (2013.01); *G06T 2207/30041* (2013.01)

(58) Field of Classification Search
CPC . G06T 2207/10024; G06T 2207/20021; G06T 2207/20208; G06T 2207/20212; G06T 2207/30041; G06T 5/94; G06T 2207/20012; A61B 3/12; A61B 3/14
See application file for complete search history.

(56) References Cited

U.S. PATENT DOCUMENTS

| | | | | |
|---|---|---|---|---|
| 9,344,613 | B2* | 5/2016 | Cote | H04N 25/683 |
| 2008/0100554 | A1* | 5/2008 | Mori | G09G 3/3406 |
| | | | | 345/89 |
| 2014/0152686 | A1* | 6/2014 | Narasimha | G06T 5/92 |
| | | | | 345/589 |
| 2015/0110368 | A1* | 4/2015 | Solanki | G06T 3/14 |
| | | | | 382/128 |
| 2018/0084280 | A1* | 3/2018 | Thiagarajan | H04N 19/61 |
| 2019/0065905 | A1* | 2/2019 | Rephaeli | G06F 18/217 |
| 2020/0195940 | A1* | 6/2020 | Noorkami | G11B 27/02 |
| 2021/0275088 | A1* | 9/2021 | Fleury | A61B 5/489 |

OTHER PUBLICATIONS

Pizer_1987, Adaptive histogram equalization and its variations, Computer Vision, Graphics, and Image Processing, Sep. 1, 1987, 355-368, 39: 3.

Sanparith, Image enhancement using local intensity distribution equalization, Eurasip Journal on Image and Video Processing, Dec. 1, 2015, 31, 2015:1.

* cited by examiner

SYSTEMS AND METHODS FOR GENERATING ENHANCED OPTHALMIC IMAGES

INTRODUCTION

Aspects of the present disclosure relate to systems and methods for enhancing frames in an image stream for use during surgical procedures, such as eye surgeries.

Cataract surgery generally involves replacing a natural lens of a patient's eye with an artificial intraocular lens (IOL). During the cataract surgery, imaging devices may be used to generate an image stream of the patient's eye to help perform the surgery. For example, the image stream may provide the medical practitioner with real-time, magnified views of the patient's eye for use during the surgery. However, unprocessed individual frames of the image stream may not include enough detail to be useful to the medical practitioner and processed frames may not be processed quickly enough to enable the real-time use by the medical practitioner, which can lead to sub-optimal surgical outcomes.

Therefore, there is a need for improved systems and methods for processing frames in images streams for display to the medical practitioner.

BRIEF SUMMARY

Certain embodiments provide an ophthalmic imaging device for enhancing captured image data. The ophthalmic imaging device comprises an image capture component and an image processor. The image capture component is configured to generate an image stream. The image stream comprises a first frame capturing a branch of veins in an eye of a patient and a second frame capturing the branch of veins, where the second frame follows the first frame in the image stream. The image processor is configured to calculate first order statistics for individual blocks of a plurality of blocks for the first frame. Each block of the plurality of blocks for the first frame comprises a plurality of first frame pixels. The image processor is also configured to interpolate first order statistics for the first frame based on the calculated first order statistics for the individual blocks of the plurality of blocks for the first frame and generate a tone mapping function for pixels of the second frame based on the interpolated first order statistics for the first frame. The first order statistics for the first frame are based, at least in part, on the branch of veins. The image processor is further configured to calculate tone mapping values for individual pixels of the second frame based on the tone mapping function. The image processor is additionally configured to generate an enhanced frame based on application of the calculated tone mapping values for individual pixels of the second frame to the pixels of the second frame.

Another embodiment provides a method of processing and enhancing images. The method comprises generating an image stream. The image stream comprises a first frame capturing a branch of veins in an eye of a patient and a second frame capturing the branch of veins in the eye, where the second frame follows the first frame in the image stream. The method further comprises calculating first order statistics for individual blocks of a plurality of blocks for the first frame, the individual blocks of the plurality of blocks for the first frame comprising a plurality of first frame pixels, and interpolating first order statistics for the first frame based on the calculated first order statistics for the individual blocks of the plurality of blocks for the first frame. The first order statistics for the first frame are based, at least in part, on the branch of veins. The method also comprises generating a tone mapping function for pixels of the second frame based on the interpolated first order statistics for the first frame and calculating tone mapping values for individual pixels of the second frame based on the tone mapping function. The method additionally comprises generating an enhanced frame based on application of the calculated tone mapping values for individual pixels of the second frame to the pixels of the second frame.

An additional embodiment comprises an ophthalmic imaging device for capturing and enhancing images. The imaging device comprises an image capture component and an image processor. The image capture component is configured to generate an image stream of at least a portion of an eye of a patient, where the image stream comprises a first frame capturing a branch of veins in the eye and a second frame capturing the branch of veins in the eye that follows the first frame in the image stream. The image processor is configured to divide the first frame into a plurality of blocks, where each block comprises a plurality of pixels. The image processor is further configured identify image enhancement parameters for the first frame based on the plurality of blocks and generate an image enhancement function for the second frame based on the identified image enhancement parameters of the first frame. The first order statistics for the first frame are based, at least in part, on the branch of veins. The image processor is additionally configured to apply the image enhancement function to the second frame with the identified image enhancement parameters for the first frame and generate an enhanced frame based on application of the image enhancement function to the second frame.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
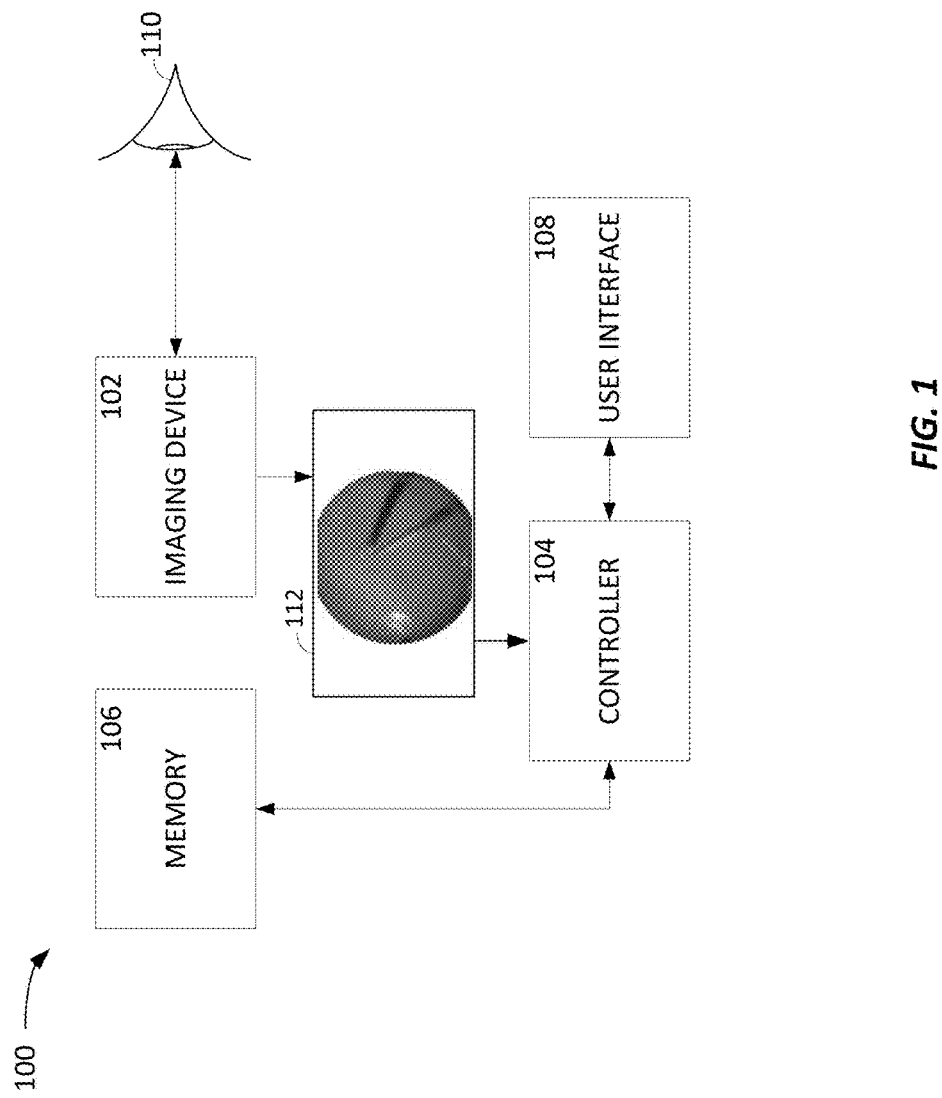
FIG. 1 illustrates a block diagram of an image processing system that processes and enhances imagery of a patient's eye, according to example embodiments described herein.

Medical imagery is frequently used to support medical practitioners during various types of medical procedures. For example, during cataract surgery, a medical practitioner may use an imaging device, such as a retinal camera or other ocular imaging device focused on a patient's eye, to capture imagery of the patient's eye during the surgery. The captured imagery may assist the medical practitioner with, for example, monitoring or detecting tool (or other object) placement and eye condition during the surgery.

In some cases, it is difficult to enhance the imagery in real-time for display to the medical practitioner because capturing, processing, and enhancing a current frame of the imagery introduces lag. In other words, the processing and enhancement of the current frame cannot be completed quickly enough to display the enhanced current frame in real-time, or near real-time, to the medical practitioner. This lag could create safety risks for tool placement and other sensitive procedures.

The systems and methods described herein overcome problems with conventional methods by processing a preceding frame to identify enhancement parameters to apply to the current frame, which eliminates the problematic lag while enabling improved imaging characteristics. Using a preceding frame to determine image enhancement characteristics for a following frame is effective in cases where consecutive frames of imagery, for example of a patient's eye during a surgery, include portions that are relatively static between the consecutive frames; thus the enhancement characteristics for the preceding frame work well for enhancing the following frame that shares portions with the preceding frame.

A static portion of an image (referred to herein interchangeably as frame) may generally include content in a portion or area of the frame that is the same or substantially the same as frame content in corresponding portions across or between the consecutive frames. For example, structures of the patient's eye captured in a first portion of the preceding frame are likely located in a corresponding first portion of the current frame because the patient's eye and the imaging device likely will not move drastically between the consecutive frames. Thus, the enhancement parameters for the preceding frame, for at least the static portions, will generally apply also to the current frame.

By employing the enhancement parameters from the preceding frame to the current frame, enhancement of the current frame can be completed more quickly, which enables the real-time (or near real-time) enhancement and display of the current frame to the medical practitioner. The enhancement of the imagery can improve contrast of the imagery, enabling the medical practitioner to better see structures in the eye, tools, and the like, which improves on the conventional compromise between image latency and image quality.

In some embodiments, processing of one or more preceding frames can be performed in parallel with enhancing the current frame, where the preceding frame is processed to generate the enhancement parameters used to enhance the current frame while the current frame is captured. In some embodiments, such processing of one or more of the previous frames can be performed in advance of a current or subsequent frame being generated, such that when the current or subsequent frame is generated, the enhancement parameters to enhance the current or subsequent frame are already available.

Accordingly, certain aspects of the present disclosure provide image processing systems and devices for generating, enhancing, and displaying image data that may be used in medical imaging equipment as well as other types of imaging equipment. By using the enhancement parameters for preceding frames to enhance subsequent frames in the image stream, the image processing systems and devices can present enhanced image frames in real-time, or near real-time, which was not possible with conventional methods.

Note that the systems, methods, and techniques described herein are described in the context of surgical procedures as one example; however, these systems, methods, and techniques are widely applicable to various imaging systems, including pre- and/or post-operative procedures, as another example. Furthermore, the systems, methods, and techniques described herein can be applied in various other medical embodiments (for example, capturing frames of one or more aspects of an anatomy). Similarly, the systems, methods, and techniques described herein can be applied in various non-medical embodiments where contents depicted between successive frames in the imagery are relatively static such that a current frame can be enhanced based on enhancement parameters generated from a preceding frame.

Example Image Processing System

FIG. 1 illustrates a block diagram of an image processing system 100 that processes and enhances imagery of, in this example, a patient's eye 110, according to example embodiments described herein. The system 100 includes a controller 104 that is communicatively coupled with an imaging device 102. The imaging device 102 is representative of one or more imaging devices used to capture the image stream of frames of the patient's eye 110, in this example. The controller 104 may be configured to analyze the frames of the image stream received from the imaging device 102, for example, a current frame 112 that corresponds to a most recently captured frame in the image stream. Such analysis may comprise identifying various aspects of the frame 112, such as image enhancement parameters, and enhancing the frame 112 based on the enhancement parameters.

In some embodiments, the controller 104 may be remote from the imaging device 102 and may be communicatively coupled by a data connection, such as a network connection. For example, controller 104 may be configured to support multiple imaging devices at a single location (e.g., at one or more ophthalmic practices, which may be located remote from each other). Note that an ophthalmic practice herein may refer to (1) a clinic at which pre-operative and/or post-operative imaging is performed for patients' eyes in preparation for a surgical procedure and/or (2) an ophthalmic surgical practice at which intra-operative images are generated for patients' eyes during a surgical procedure.

The controller 104 is also coupled to a data store or memory 106 that stores frames captured by the imaging device 102 and corresponding data (such as enhancement parameters) obtained from analysis of the captured frames. In certain embodiments, the memory 106 is a cache memory that is co-located with the controller 104 and stores one or more previous frames and/or corresponding enhancement parameters for the one or more previous frames. In some embodiments, the memory 106 comprises a central and/or cloud-based database or repository for storing original and enhanced frames (and corresponding data) of the patient's eye 110. In some embodiments, the original and enhanced frames of the patient's eye 110 and the corresponding enhancement parameters may be associated with a profile for the patient whose eye 110 is imaged with the imaging device 102. In certain embodiments, the memory 106 may be representative of a device memory, an on-premises or cloud-based database or repository dedicated for use at the ophthalmic practice, and so forth.

In some embodiments, the controller 104 is a local processor or computing system accessible by the imaging devices 102. For example, the controller 104 may refer to a computing system that is dedicated and/or local to the imaging device 102 and/or the ophthalmic practice. In certain embodiments, the controller 104 may correspond to computing resources (e.g., including one or more processors and/or computing systems) provided through a "cloud" service. In certain embodiments, the network that connects one or more components of the system 100 may include one or more switching devices, routers, local area networks (e.g., an Ethernet), wide area networks (e.g., the Internet), and/or the like.

The imaging device 102, as shown in FIG. 1, comprises any imaging device, such as an ocular imaging device in this particular example, configured to generate an image stream that comprises one or more frames (for example, the current frame 112) of the patient's eye 110 captured over a period. In some embodiments, the frames generated by the imaging device 102 may be used to analyze and/or view one or more of aspects of optical components and features of the patient's eye 110, relationships of components of the patient's eye 110, tools and corresponding devices being used during a surgical procedure, and the like. In some embodiments, the imaging device 102 comprises one or more of an optical coherence tomography (OCT) device, a scanning laser ophthalmoscope (SLO) device, a scanning laser polarimetry device, 3-dimensional imaging and visualization devices, a high dynamic range (HDR) camera, a retina view system, a retina viewing lens, a surgical microscope, and the like.

In some embodiments, the imaging device 102 includes a dedicated processor that executes instructions provided by a dedicated memory to capture frames of the patient's eye 110, analyze the captured frames, enhance the captured frame for display to the medical practitioner, and allow an user to operate the imaging device 102 through, for example, a dedicated user interface, etc. of the imaging device 102. The user interface of the imaging device 102 may enable a user, such as the medical practitioner, to interact with and control the imaging device 102.

The imaging device 102 includes device features for imaging the patient's eye 110. Non-limiting examples of such device features include at least one of optical features, emission features, imaging features, and control features. The optical features comprise one or more lenses or other optical components for focusing and directing light projected to and reflected by a target object of the patient's eye 110. The optical features enable the imaging device 102 to view and image the patient's eye 110, focus optical beams into the eye, etc., to generate and capture frames of the patient's eye 110.

The emission features comprise a light or other signal source configured to emit a signal (e.g., the optical beams, ultrasonic sound waves, etc.) into the patient's eye 110. The emission features may be adjustable with regard to positioning, focusing, power level, or otherwise directing the signal as needed by the medical practitioner or in an automated manner. The imaging features include features that generate, receive, process, and/or digitize signals that that reflect or echo back from the patient's eye 110 or otherwise represents the patient's eye 110. The imaging features are responsible for generating multi-dimensional images based on the received signals. The imaging features may acquire, store, and/or process image data based on the received signals. Examples of imaging features in the imaging device 102 may include image processing components and the like.

The control features enable the medical practitioner to activate, deactivate, and adjust the device features of the imaging device 102. For example, the control features include components that enable adjustment of the emission features, such as controls to turn on/off the emission features, captures frames using the imaging features, and so forth. Similarly, the control features include components that enable adjustment of the optical features, such as to enable automatic or manual focusing of the optical features or movement of the optical features to view different targets or portions of the target. In some embodiments, the user interface of the imaging device 102 includes the control features.

In some embodiments, the enhanced frames can be used pre-operatively to prepare a surgical plan in preparation for a surgical procedure (e.g., cataract surgery). In certain embodiments, the ophthalmic practice may use the imaging device 102 in connection with an operating room to obtain, process, and display an image stream of the patient's eye 110 during the surgical procedure.

As introduced above, the imaging device 102 may communicate frames of the patient's eye 110 to the controller 104 for processing (for example, enhancement), storage, and display. As part of the processing, storage, and display of the frames, the controller 104 may receive the frames from the image device 102, process and enhance the frames, and store and/or display the enhanced frames for use by the medical practitioner. Enhancement of the image stream may comprise, for example, contrast enhancement, which increases perceived qualities for the frames in the image stream. Contrast enhancement can be applied to a current frame 112 (or any frame of the image stream) such that aspects of the frame 112 stand out more as compared to unenhanced, or raw, frames. Contrast enhancement may make optimal use of colors available on a display or output device on which the enhanced frames are displayed. Further details of the processing and enhancement of the frames will be provided below.

As described above, the memory 106 stores one or more frames (raw and/or enhanced) and corresponding data (for example, the enhancement parameters) associated with the stored frames. In some embodiments, the memory 106 stores the one or more frames after they are processed and enhanced by the controller 104. In some embodiments, the one or more frames and corresponding data are associated with patient profiles. In certain embodiments, the memory 106 stores the frames for later retrieval, for example, in response to a request from the controller 104 or the like. In some embodiments, the memory 106 operates as a cache memory that stores frames and corresponding data and that enables the controller 104 to quickly and efficiently access particular processed frames and corresponding data, for example, during processing and enhancement of subsequent frames.

In some embodiments, the memory 106 further stores enhancement parameters, which may comprise tone mapping parameters or other similar image enhancement characteristics, parameters, or statistics generated from the processing of one or more frames. For example, where the controller 104 processes one of the frames generated by the imaging device 102 to identify one or more tone mapping parameters, such as one or more image statistics, including a mean pixel grayscale or luminance or a standard deviation of pixel grayscale or luminosity for individual blocks or an entirety of the frame, the memory 106 may store the processed frame and the corresponding tone mapping parameters. In some embodiments, the corresponding tone mapping parameters are associated with the frame from which the corresponding tone mapping parameters were generated. Thus, the corresponding tone function parameters may be used in conjunction with subsequent frames generated by the imaging device 102.

Example Flow Diagrams for Processing and Enhancing Images

Figure 2A:
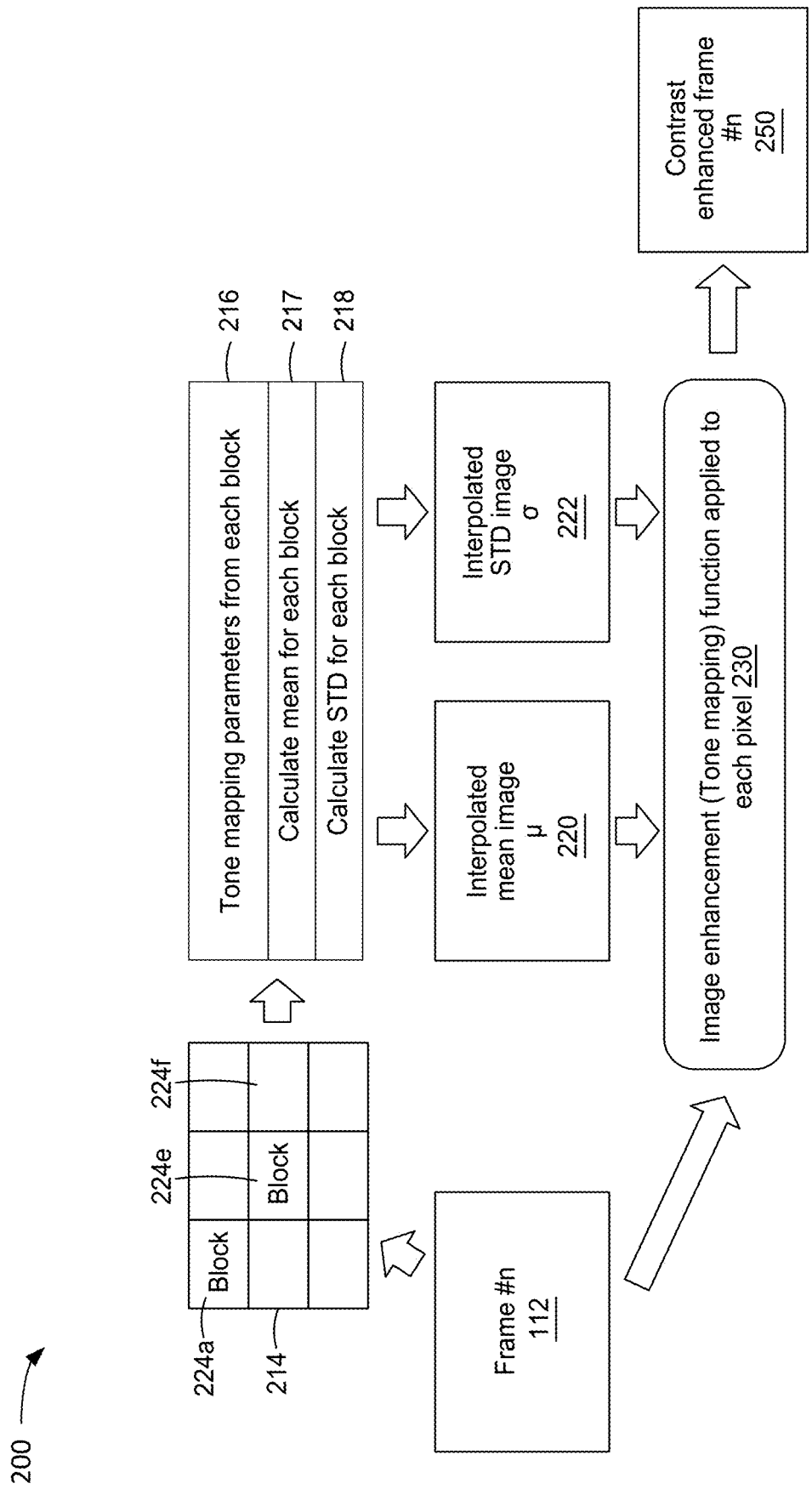
FIG. 2A is an example flow diagram illustrating how image data is processed to generate an enhanced frame, according to aspects described herein.

FIG. 2A is an example data flow diagram (data flow) 200 illustrating how image data (e.g., for frame 112 in FIG. 1) is processed to generate an enhanced frame 250 using an adaptive equalization algorithm or other algorithm that spreads intensities of all or a subset of image pixels out to occupy all the available intensity dynamic range, according to aspects described herein.

The data flow 200 shows the frame 112 as generated by the imaging device 102, described above with reference to FIG. 1. The frame 112 is processed, for example, by the controller 104 to logically divide the frame 112 into a plurality of blocks 224 or tiles, as shown by blocked frame 214 with 9 blocks 224a-224i. In certain embodiments, the controller 104 generates the blocked frame 214 based on logically dividing the frame 112 into a number of blocks 224 having the same relative size, varying in size or shape, or having consistent or even spacing, for example, at different parts of the frame 112. For example, the controller 104 may identify the number of blocks 224 without actually dividing the frame 112 itself to create the blocked frame 214. The controller 104 may process the frame 112 according to the logical blocks 224 of the blocked frame 214.

In some embodiments, dividing the frame 112 into the plurality of blocks 224 comprises the controller 104 analyzing the frame 112 to identify one or more portions of the frame 112 that do not need to be processed further, such as portions of the frame 112 that border but are not part of the patient's eye 110. For example, the frame 112 includes a white border portion that substantially surrounds a portion of the frame 112 corresponding to the patient's eye 110. The white border portion is otherwise irrelevant to the analysis and enhancement of the frame 112. The controller 104 may identify the white border portion and mark that portion as being irrelevant and not needing further processing because the white border portion does not include any aspects of the patient's eye 110. By not processing such the white border portion (and similar irrelevant, or black space, portions) of the frame 112, the controller 104 avoids processing portions of the frame 112 that are not of interest and could otherwise adversely impact image statistics and parameters generated by the controller 104 based on the frame 112. This may improve efficiencies and enhancement times of frames in the image stream.

In some embodiments, the controller 104 identifies the white border portion (and other irrelevant portions) of the frame 112 based on image processing using machine learning model or other image processing algorithms. For example, the controller 104 may apply one or more image segmentation algorithms to the blocks 224 of the blocked frame 214. In some embodiments, the controller 104 may use a trained machine learning (ML) model to identify relevant or irrelevant portions of the frame 112. A collection of previously processed frames may provide a dataset (referred to as the "training dataset") for use in training the ML model that can identify relevant and irrelevant portions of blocks 224 of the frame.

In some instances, the ML model is trained using one or more ML algorithms, such as the image segmentation algorithms, in conjunction with the training dataset. The ML algorithms may include a supervised learning algorithm, an unsupervised learning algorithm (such as K-means and Gaussian Mixture Model), and/or a semi-supervised learning algorithm. Unsupervised learning is a type of machine learning algorithm used to draw inferences from datasets consisting of input data without labeled responses. Supervised learning is the ML task of learning a function that, for example, maps an input to an output based on example input-output pairs. Supervised learning algorithms, generally, include regression algorithms, classification algorithms, decision trees, neural networks, etc.

In certain embodiments, a trained ML model refers to a function, for example, with weights and parameters that is used to identify the relevant and irrelevant portions of the blocks 224 in the frame 112. Once trained and deployed, the ML models are able to identify the relevant or irrelevant portions of blocks 224, as output.

The controller 104 processes the blocked frame 214 to calculate one or more tone mapping parameters (or enhancement parameters) 215, which may correspond to the enhancement parameters used to generate the enhanced frame 250 corresponding to the frame 112. Calculating the one or more tone mapping parameters 215 may comprise the controller 104 calculating the tone mapping parameters for each block 224 of the blocked frame 214 or for the blocked frame 214 as a whole. In some embodiments, the controller 104 may calculate the tone mapping parameters 215 at a pixel level of the blocks 224 of the blocked frame 214.

In some embodiments, where the controller 104 calculates the tone mapping parameters 215 at the block level, the controller 104 calculates an order statistic, such as a first order statistic, for an aspect (for example, of a block 224) of the blocked frame 214. A first order statistic for a portion of a frame can be calculated based on a function that determines a probability that a particular pixel having a particular value of interest occurs in the portion of the frame. The first order statistics may be based on individual pixel values independent of neighboring pixels. In some embodiments, the first order statistics may be generated based on a first-order histogram of pixel values that relates numbers of pixels with particular pixel values, such as grayscale values. Examples of the first-order statistics include mean, standard deviation, skew, and so forth. Thus, the tone mapping parameters 215 can comprise one or more of a mean pixel grayscale 216 for each block 224 of the blocked frame 214 or a standard deviation of pixel grayscale 217 of each block 224 of the blocked frame 214, and so forth. In some embodiments, the mean pixel grayscale 216 (mean, μ) and the standard deviation of pixel grayscale 217 (STD, σ) are calculated according to the equations below:

$$H(g) = \frac{\text{number of pixels with particular grayscale value}}{\text{total number of pixels in block}}$$

$$\text{mean} = \mu = \sum_{n=0}^{N-1} nH(n)$$

$$STD = \sigma = \sqrt{\sum_{n=0}^{N-1} (n-\mu)H(n)}$$

The first order statistic can be a smallest sample value (i.e., a minimum sample value) of a set of sample values arranged in ascending order. For example, in the sample set 21, 2, 11, 15, 71, 4 the first order statistic is 2. Thus, as applied to the mean pixel grayscale 216 and the standard deviation of pixel grayscale 217 of each block 224 of the blocked frame 214, the first order statistic of the mean pixel grayscale 216 may correspond to the smallest mean pixel grayscale for a corresponding block 224. Similarly, the first order statistic of the standard deviation of pixel grayscale 217 may correspond to the smallest standard deviation of pixel grayscale for the corresponding block 224. While the examples described herein relate to pixel grayscale (or luminosity or intensity), in some embodiments, the tone mapping parameters 215 comprise statistics generated from other values of the frame or image stream, such as chrominance values, color values, and the like. Furthermore, the tone mapping parameters 215 calculated at the pixel level or the frame level can have corresponding first order statistics calculated by the controller 104. In some embodiments, the first order statistics described herein apply to a grayscale channel obtained from an analysis or processing of green pixels of the preceding frame 212. For example, the grayscale described here can correspond to the green channel grayscale for a frame, such as the preceding frame 212. In some embodiments, the tone mapping function may be applied to a green channel grayscale of the current frame 112.

In some embodiments, based on one or more of the calculated first order statistics for the blocks 224 of the blocked frame 214 or for the pixels of the blocked frame 214, the controller 104 interpolates a mean pixel grayscale for the entire blocked frame 214, generated as an interpolated mean pixel grayscale 218. Similarly, the controller 104 interpolates a standard deviation of pixel grayscale for the entire blocked frame 214 based on the first order statistics of the blocks 224 (or pixels) of the blocked frame 214, generated as an interpolated standard deviation of pixel grayscale 219. Interpolation may correspond to a process of using known data values to predict or estimate values for unknown data values. In some embodiments, interpolation can be used to combine various aspects of the blocked frame 214. Interpolation can also be used to generate smooth representations of first order statistics across blocks 224, thereby smoothing edges between the blocks 224 of the blocked frame 214.

For example, the controller 104 interpolates (adjacent) neighboring blocks 224 to smooth transitions between or among pixels of the neighboring blocks 224. The blocks 224 that have four neighbor blocks 224 in the frame, such as a block 224e, will be interpolated using the four neighbor blocks 224b, 224d, 224f, and 224h (corresponding to the blocks 224 to the top, bottom, left, and right) of the block 224e. For a block that is on an edge of the frame, such as the block 224f, the block 224f is missing a neighbor along the right edge of the block 224f. However, to enable interpolation similar to that performed for the block 224e, the controller 104 can duplicate one of (1) the block 224f to represent the missing neighbor block along the right edge of the block 224f or (2) the block 224e neighboring the block 224f on a side opposite a location of the missing neighbor block right edge and use that duplicate for the interpolation using four neighbor blocks 224. In some embodiments, duplicating blocks during interpolation removes a "specialness" of the duplicated blocks, so calculation for the edge blocks can be done in the same way as non-edge blocks. This use of the duplicate block(s) may limit introduction of variance into the interpolation process that may otherwise result from performing interpolation with less than four neighbor blocks 224. In some embodiments, the missing neighbor block is filled with a block from an opposite edge of the missing neighbor block.

The controller 104 may employ one or more adaptive or non-adaptive interpolation methods. An adaptive interpolation method comprises an interpolation that changes based on pixels being interpolated, while non-adaptive interpolation methods are applied consistently to all pixels. Examples of non-adaptive interpolation algorithms include nearest neighbor, bilinear, bicubic, spline, and the like. In certain embodiments, the interpolation performed by the controller 104 uses one or more non-adaptive interpolation methods.

The controller 104 can perform frame interpolation of the blocked frame 214 to identify or achieve a best approximation values (for example, the enhancement parameters introduced above) for the blocked frame 214. For example, the controller 104 may generate a best approximation of the mean pixel grayscale and a best approximation of the standard deviation of pixel grayscale for the entire blocked frame 214 based on the mean pixel grayscale and the standard deviation of pixel grayscale, respectively, for the blocks of the blocked frame 214.

Based on the interpolated or best approximation values generated by the controller 104, the controller 104 generates and applies the interpolated mean pixel grayscale values and the standard deviation of pixel grayscale as inputs to a tone mapping function 230 (for example, a frame enhancement algorithm). The tone mapping function 230 may map a first set of colors (or intensities or grayscales) in a frame to a second set of colors (or intensities or grayscales, respectively). Accordingly, the controller 104 applies the tone mapping function 230 to each pixel of the blocked frame 214 to generate an enhanced frame 250, which is an enhanced version of the frame 112 generated by the imaging device 102. The enhanced frame 250 may comprise a contrast enhanced frame, as compared to the frame 112, or may be the frame 112 enhanced in one or more other ways. In some embodiments, the enhanced frame 250 enables the medical practitioner to view various details of the patient's eye 110 that may otherwise be lost in the raw or unenhanced frame 112. In some embodiments, the tone mapping function 230 apply to a luminance channel of the frame 112 when the first order statistics are generated based on a luminance channel of the preceding frame 212. In some embodiments, the tone mapping function 230 can be applied to a luminance channel of the current frame 112.

As introduced above, performing such processing of the frame 112 to divide the frame 112 into blocks and process the blocks to generate the tone mapping parameters for use in the tone mapping function 230 before generating the enhanced frame 250 involves an amount of time that is not readily available or feasible during, for example, the surgical procedure. Thus, the processing of the FIG. 2A may not be able to provide enhanced frames 250 for the frame stream generated by the imaging device 102 during the surgical procedure.

In certain embodiments, as introduced above, the controller 104 processes or analyzes a preceding frame in the frame stream while a current frame is being generated by the imaging device 102. Such parallel frame processing enables the controller 104 to use enhancement parameters for the preceding frame to enhance the current frame and, in aggregate, provide an enhanced image stream quickly for viewing by the medical practitioner.

In some embodiments, the enhancement parameters of the preceding frame can be applied to the current frame because subsequent frames in the image stream often have continuous features that are in generally the same portions or areas in the subsequent frames, as introduced above. For example, a first portion of a preceding frame may depict a branch of veins in the patient's eye 110. The current frame may include the same branch of veins in the corresponding first portion of the preceding frame. Thus, the enhancement parameters for the first portion from the preceding frame can be applied to the corresponding first portion of the current frame. The consecutive frames in the image stream may share a large amount of content, meaning that corresponding pixels in consecutive frames of the image stream generally the same or similar, or substantially the same, content. Such continuous features enable the use of the enhancement parameters for the preceding frame to the current frame because the aspects that enhance the continuous features in the preceding frame will more often than not work for the corresponding continuous features in the current frame in the similar location. Thus, processing to generate the enhanced frame 250 based on the frame 112 from the image stream, as described with reference to FIG. 2A, may be applied to generate an enhanced frame for a subsequent frame in the image stream based on the enhancement parameters for one or more preceding frames.

This ability to process a current frame (such as the frame 112) based on enhancement parameters from a preceding frame to generate the enhanced frame 250 of the current frame enables faster handling and processing of frames of the image stream during the surgical procedure. Instead of having to process the frame 112 to identify the tone mapping parameters for the frame 112 before generating the enhanced frame 250, the controller 104 can use the enhancement parameters from an frame preceding the frame 112 and only generate the enhanced frame 250 based on the frame 112 using the enhancement parameters. This saves time and enables display of enhanced frames to the medical practitioner in real time.

In some embodiments, because the target of the image stream generally should not move much relative to the different frames in the image stream, the enhancement parameters generated based on the frame 112 can be applied to a number of subsequent frames in the image stream. An example of using the enhancement parameters from a preceding frame for a subsequently capture, current frame 112 to generate an enhanced frame 250 of the current frame 112 is described with reference to FIG. 2B.

Figure 2B:
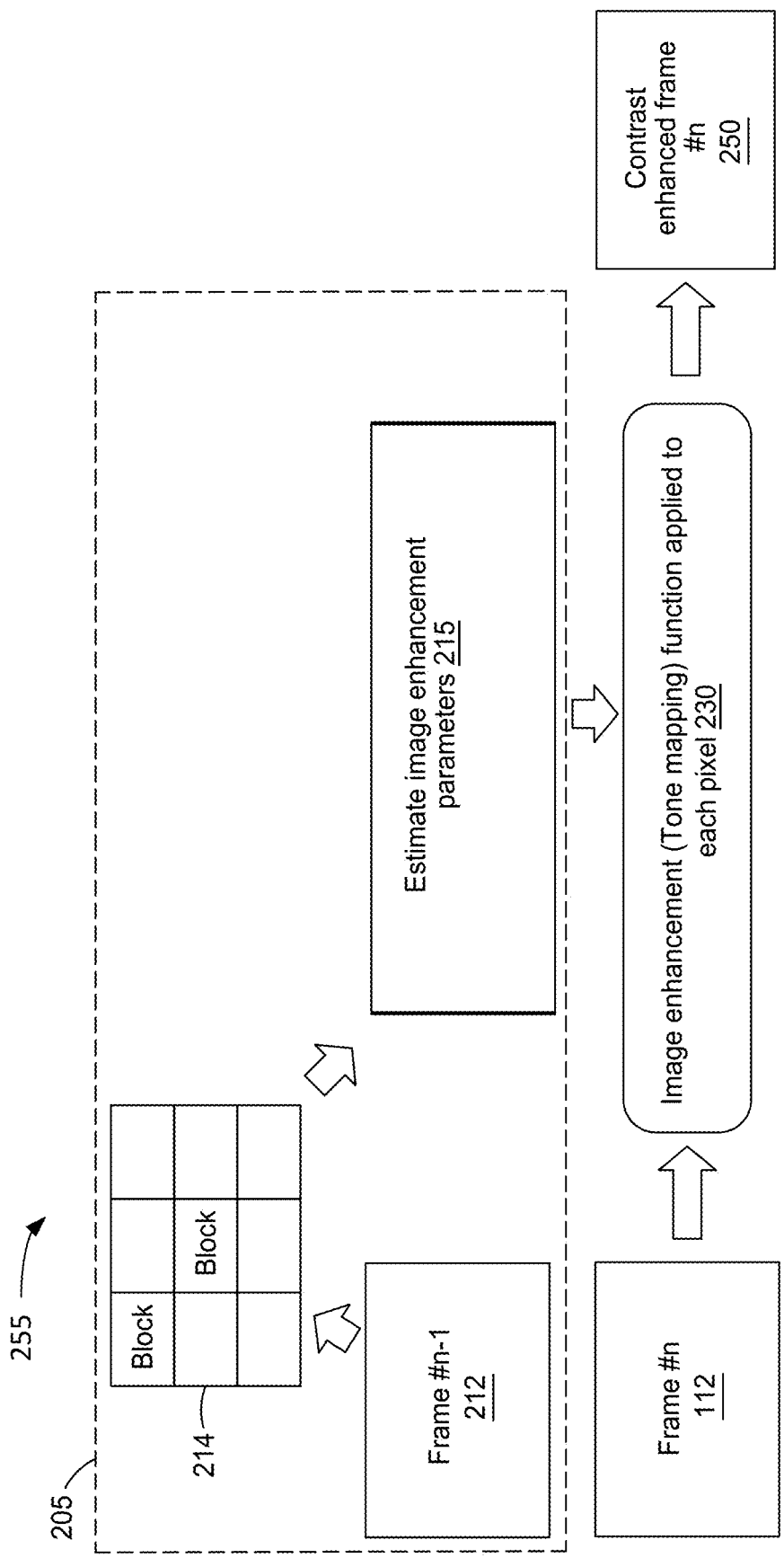
FIG. 2B is an example flow diagram illustrating how parallel processing is used to generate the enhanced frame of the current frame in parallel with processing a preceding frame, according to aspects described herein.

FIG. 2B is an example data flow diagram 255 illustrating employing the parallel processing to generate the enhanced frame 250 of the current frame 112 in parallel with processing the preceding frame. The data flow diagram 255 includes many aspects that are similar to aspects shown in the data flow 200 of FIG. 2A. Corresponding aspects between the data flows 200 and 255 may have corresponding functionality and operations, and so forth. Thus, for one or more aspects of the data flow 255 that correspond to the aspects in the data flow 200, corresponding description will not be duplicated for brevity.

The data flow 255 begins with the frame 112 as generated by the imaging device 102. The frame 112 may represent a non-initial frame of the image stream generated by the imaging device 102 of the patient's eye 110. The initial frame of the image stream does not have a preceding frame. Accordingly, the initial frame cannot be enhanced based on the enhancement parameters of the preceding frame.

The data flow 255 includes a block 205 corresponding to processing, by the controller 104, of the preceding frame 212 in the image stream that precedes the frame 112. For example, if the frame 112 is a second frame of the image stream, the block 205 corresponds to processing of the preceding frame 212, which is a first frame of the image stream, by the controller 104. In some embodiments, the processing in the block 205 may be performed by the controller 104 on multiple preceding frames. For example, when the frame 112 is the $10^{th}$ frame in the image stream, the controller 104 may perform the processing of the block 205 based on any combination of preceding frames 1-9 in the image stream.

In some embodiments, the processing of the one or more preceding frames results in or generates enhancement parameters 215 for the one or more preceding frames. For example, the enhancement parameters 215 can be expressed as a weighted summation of enhancement parameters from multiple preceding frames. The enhancement parameters 215 can be applied using a tone mapping function 230 (for example, a tone mapping function 230) to enhance the frame 112. In some embodiments where the frame 112 is enhanced based on multiple preceding frames, the enhancement parameters 215 for the different preceding frames are weighted according to how close or proximate the preceding frame is to the frame 112 in the image stream. Where the enhancement parameters from the $7^{th}$-$9^{th}$ frames are used to enhance the $10^{th}$ frame, the enhancement parameters from each of the $7^{th}$, $8^{th}$, and $9^{th}$ frames may be weighted differently when used to enhance the $10^{th}$ frame. For example, the $7^{th}$ frame may be weighted at 0.1, the $8^{th}$ frame may be weighted at 0.5, and the $9^{th}$ frame may be weighted at 1.0. For example, older frames in the image stream (relative to the frame 112) may have smaller weights than newer frames in the image stream. In certain embodiments, the enhancement parameters 215 can increase or decrease across the $7^{th}$-$9^{th}$ frames depending on the predicted trends. In some embodiments, the weights for all preceding frames sum to 1 or all preceding frames are weighted the same. In some embodiments, the processing of the block 205 occurs for each of the one or more preceding frames with equal weights, based on which the enhanced frame 250 is generated for the frame 112.

As part of the processing of the block 205, the controller 104 accesses the preceding frame 212. In some embodiments, accessing the preceding frame 212 comprises the controller 104 requesting and receiving the preceding frame 212 from the memory 106. In some embodiments, the preceding frame 212 is stored in a cache, such as a cache associated with the controller 104, which may enable quicker access to the preceding frame 212 and corresponding enhancement parameters than the memory 106.

Figure 2C:
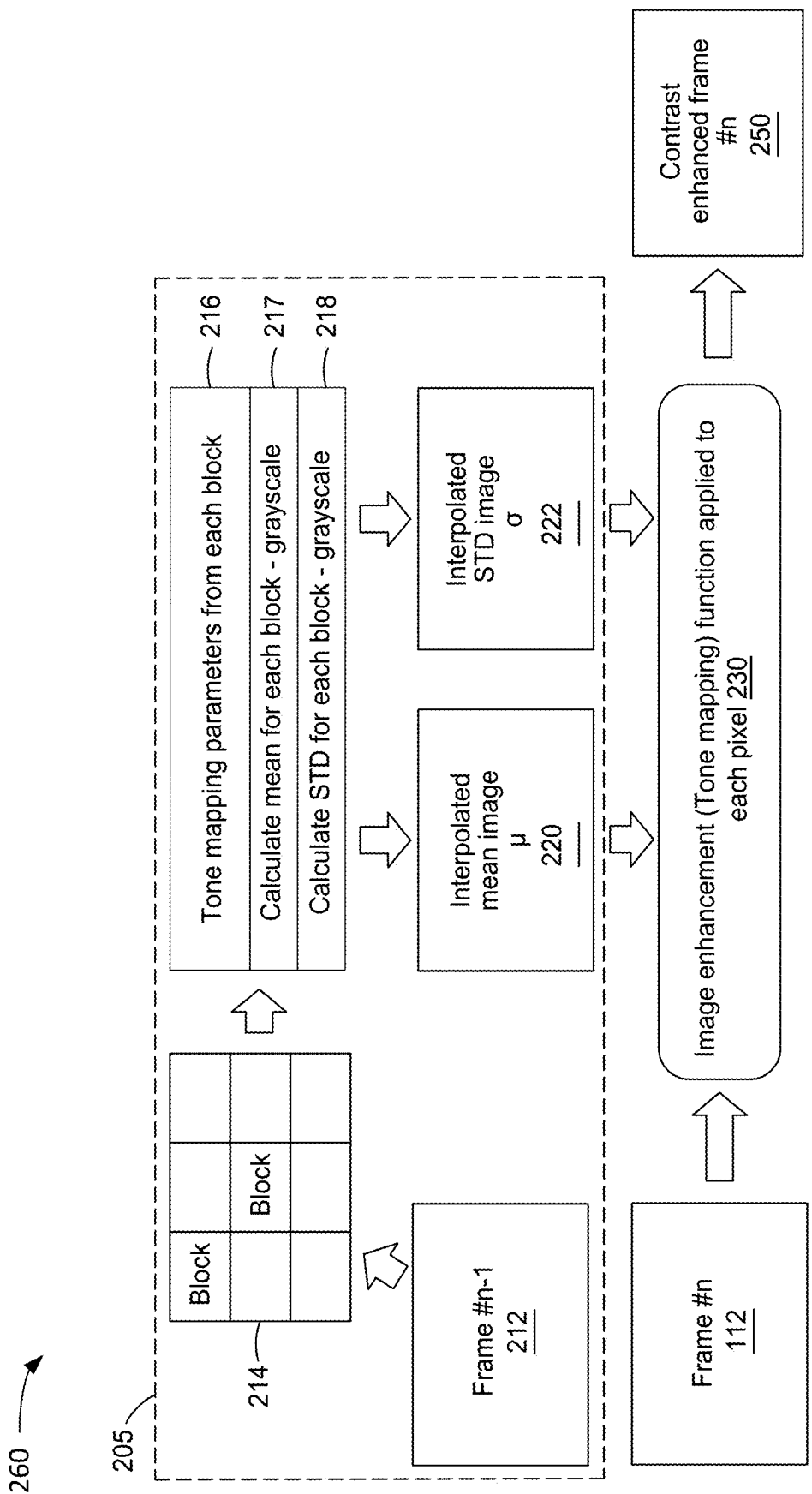
FIG. 2C is an example flow diagram that combines the parallel processing of FIG. 2B with the processing algorithm of FIG. 2A to enable analysis of the preceding frame to generate enhancement parameters used to generate the enhanced frame, according to certain aspects described herein.

FIG. 2C is an example data flow diagram 260 that combines the parallel processing of FIG. 2B with the processing algorithm of FIG. 2A to enable analyzing preceding frames 212 to generate the enhancement parameters to enhance the current frame 112. The data flow diagram 260 includes many aspects that are similar to aspects shown in the data flow 200 of FIG. 2A and the data flow diagram 255 of FIG. 2B. Corresponding aspects between the data flows 260, 200, and 255 may have corresponding functionality and operations, and so forth. Thus, for one or more aspects of the data flow 260 that correspond to the aspects in the data flow 200 or the data flow 255, corresponding description will not be duplicated for brevity.

The data flow 260 begins with the frame 112 as generated by the imaging device 102. The frame 112 may represent a non-initial frame of the image stream generated by the imaging device 102 of the patient's eye 110.

The data flow 255 includes the block 205 corresponding to processing, by the controller 104, of the preceding frame 212 in the image stream that precedes the frame 112.

As part of the processing of the block 205, the controller 104 accesses the preceding frame 212 and divides the accessed preceding frame 212 into a number of blocks of a blocked frame 214, as described above with respect to FIG. 2A.

The controller 104 then processes the blocks to calculate the first order statistics of the preceding frame, such as the mean pixel grayscale for each block and the standard deviation of pixel grayscale for each block. The controller 104 then interpolates the mean pixel grayscale and the standard deviation of pixel grayscale for the individual and neighboring blocks to generate corresponding interpolated values for the entirety of the preceding frame 212. These interpolated mean grayscale and interpolated standard deviation values may correspond to the enhancement parameters for the preceding frame 212.

In some embodiments, the processing of the blocks of the blocked frame 214 comprises calculating tone mapping parameters from subsets of pixels in one or more blocks of the blocked frame 214. In some embodiments, the processing of the blocks comprises identifying one or more other parameters of each block of the blocked frame 214 that may be identified based on processing one or more aspects of the blocked frame 214.

In some embodiments, when enhancing the image stream for display on the user interface 108, each frame 112 of the image stream is processed to generate the enhancement, or tone mapping, parameters for a subsequent frame. Once a frame is processed, the enhancement parameters for that frame can be stored in the memory 106 or a similar data store. In some embodiments, the enhancement parameters for a frame can be stored instead of the storing or saving the corresponding frame, which may save system resources, processing time, and the like. Thus, when the frame 112 is enhanced based on one or multiple preceding frames of the image stream, the controller 104 may retrieve the enhancement parameters corresponding to the one or multiple preceding frames 212 from the memory 106 or similar data store instead of or in addition to the one or multiple preceding frame 212.

In some embodiments, the processing in the block 205 to identify the tone mapping parameters for the preceding frame 212 in the image stream may be performed in parallel with the generation of the current frame 112 by the imaging device 102. Thus, when the frame 112 is received by the controller 104 for processing, the controller 104 has processed the preceding frame 212 to identify the corresponding enhancement parameters. By performing the processing of a preceding frame 212 in parallel with the generation of the current frame 112, the image processing system 100 is able to enhance frames in the image stream in real time for prompt and timely display to the medical practitioner. The controller 104 does not need to spend time processing the frame 112, but only apply the tone mapping, or similar, function to the frame 112 based on the enhancement parameters from the preceding frame 212.

In some embodiments, the processing of the preceding frame 212 comprises performing downsampling. Downsampling may correspond to processing the preceding frame 212 to reduce a size or amount of data associated with the preceding frame 212. The frames of the image stream are generally spatially smooth (meaning they include much fewer sharp edges as compared to frames that are not part of the image stream). As such, it may not be necessary to use all the pixels within a block of a frame of the image stream to calculate the first order statistics for the block. Thus, a subset of pixels may be sufficient for the calculation of the first order statistics, which can be done with less computation. Thus, the downsampling may improve speed of the processing of the preceding frames and enhancement of the current frame.

Figure 3:
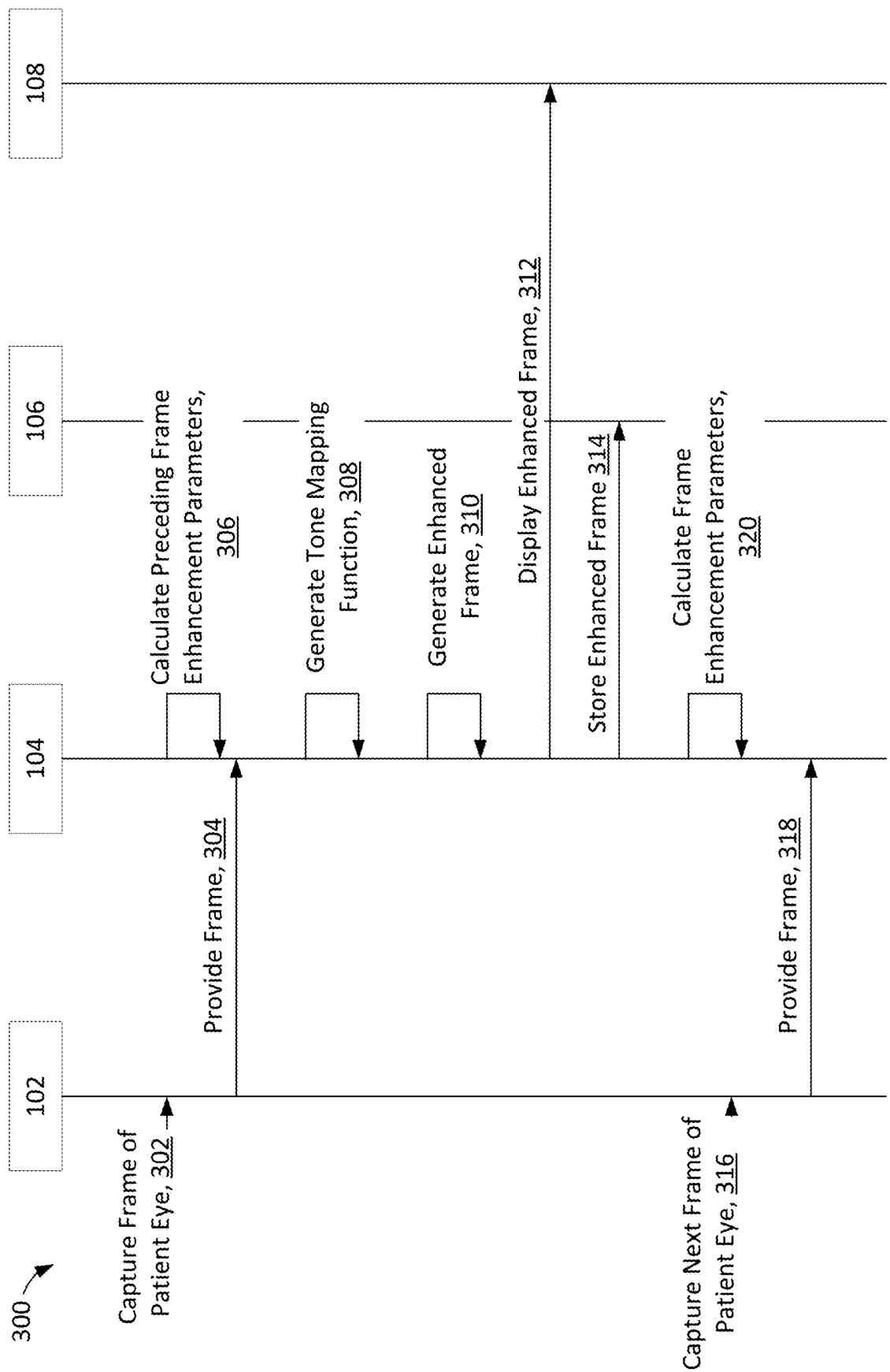
FIG. 3 is a sequence diagram illustrating communications exchanged between or processing performed by components of the system of FIG. 1 to obtain and process an image stream and to generate enhanced frames, according to certain aspects described herein.

FIG. 3 is a sequence diagram 300 illustrating communications exchanged between or processing performed by components of the system 100 of FIG. 1 to obtain and process frames of an image stream and generate enhanced frames based thereon, according to example embodiments described herein. While the sequence diagram 300 and corresponding description include reference to components of the system 100 of FIG. 1, the steps of the sequence diagram 300 are not limited to that example embodiment and may apply to various other combinations of components. Furthermore, the sequence diagram 300 is not required to perform each of or only the shown steps and is not limited to performing the indicated steps in any particular order.

The sequence diagram 300 depicts interactions between the imaging device 102, the controller 104, the memory 106, and the user interface 108. The sequence diagram 300 begins at communication step 302 with the imaging device 102 capturing a frame, such as the frame 112 of FIG. 1, of the patient's eye 110. The captured frame may be a non-initial frame of an image stream, as introduced above.

At communication 304, the imaging device 102 provides the captured frame 112 to the controller 104 for processing and enhancement.

In some embodiments, simultaneous to one or more of the imaging device 102 capturing the frame 112 or providing the captured frame to the controller 104, the controller 104 may process a preceding frame, such as the preceding frame 212 of FIG. 2A, to calculate the corresponding enhancement parameters for the preceding frame. In certain embodiments, though not shown in the sequence diagram 300, calculating the corresponding enhancement parameters comprises requesting and receiving the preceding frame from the memory 106 before calculating the enhancement parameters for the preceding frame, as described above. As part of or instead of this request for the preceding frame, the controller 104 may request the enhancement parameters for the preceding frame from the memory 106.

In some embodiments, the controller 104 requests or calculates the enhancement parameters for more than one preceding frame at processing 306. In some embodiments, instead of sending a request for the preceding frames or corresponding enhancement parameters and received the requested frames or parameters, the controller 104 may access the requested preceding frames or corresponding enhancement parameters from a cache memory.

At processing 308, the controller 104 may generate the tone mapping or similar function based on the obtained preceding frames or corresponding enhancement parameters and the frame received from the imaging device 102 and for which the controller 104 is generating the enhanced frame, such as the enhanced frame 250.

At processing 310, the controller 104 may apply the generated tone mapping function to the pixels of the frame received from the imaging device 102 to generate the enhanced frame.

At communication 312, the controller 104 provides the enhanced frame to the user interface 108 for display to the medical practitioner.

At communication 314, the controller 104 stores the enhanced frame or the enhancement parameters corresponding to the enhanced frame in the memory 106 or a corresponding cache memory.

At communications 316 and 318, the imaging device 102 generates or captures a next frame of the patient's eye 110 and provides the next frame to the controller 104, similar to communications 302 and 304 above. At processing 320, the controller 104 begins calculating the frame enhancement parameters for the frame captured at communication 302 to be used for enhancement of the next frame from communication 316. The processing 320 may correspond to the processing 306.

The communication and processing steps 302-314 can be repeated for individual frames of the image stream of the patient's eye.

Figure 4:
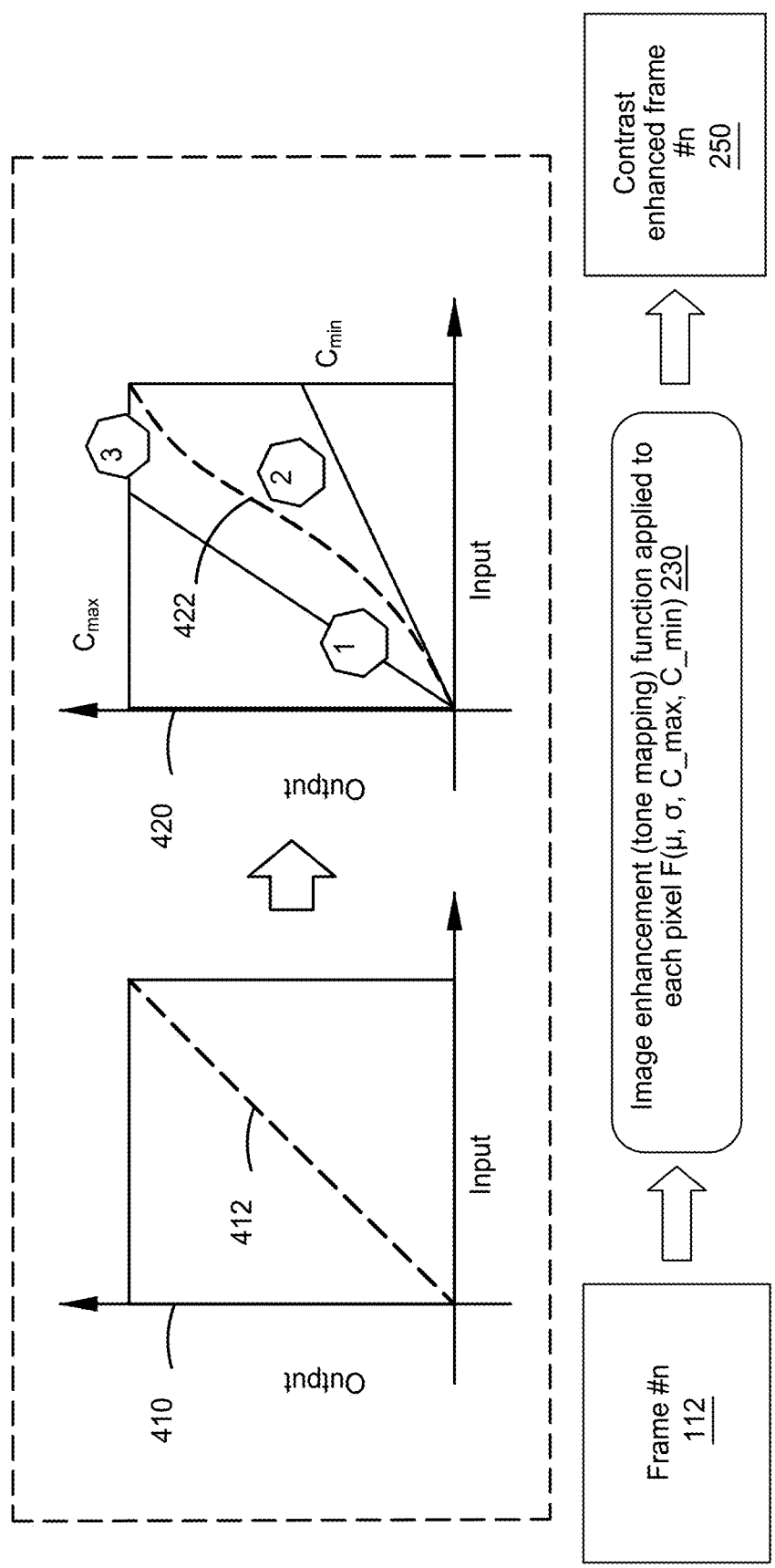
FIG. 4 depicts aspects of an example tone mapping function, according to certain aspects described herein.

FIG. 4 provides details regarding a tone mapping function (for example, the tone mapping function 230 of FIGS. 2A-2C) described herein as an example function with which the enhanced frame is generated based on the enhancement parameters from a preceding frame and the frame, according to example embodiments described herein. In some embodiments, the frame that is enhanced (for example, the frame 112) is captured as a color (RGB or similar) frame and is separated into a luminance portion (for example, grayscale from sRGB, or intensity) and a color portion (for example, an RGB ratio, and so forth). The luminance portion is the portion of the frame 112 that is enhanced, for example, using the tone mapping function 230, which can improve the contrast in the enhanced frame 250.

The graph 410 depicts a graphical representation of input frame features corresponding to intensities of blocks of the frame (along the x-axis) that are output (along the y-axis) as output frame features to a display device, such as the user interface 108 of FIG. 1) with a uniform linear relationship 412 depicted between the input and output frame features. However, this uniform linear relationship is not representative of pixel intensity within blocks of actual frames generated in the image stream. The frame features may correspond to a frame generated by an imaging device (for example, the imaging device 102 of FIG. 1).

The graph 420 depicts a graphical representation of the input and output frame features, where the blocks do not have the uniform pixel intensities across the input features. Therefore, the relationship 422 between the input and output features varies (for example, has a different slope) for different ranges of values of the function. The relationship 422 represents a 3-segment function (corresponding to the tone mapping function 230) that utilizes the first order statistics of the preceding frame 212 to emphasize the majority of pixels (i.e., those pixels having intensities that fall within the +/−2 standard deviations of the mean pixel grayscale). The calculated first order statistics of the mean pixel grayscale and the standard deviation of pixel grayscale indicate that a majority of pixels in the block (or corresponding frame portion) are contained within a range of +/−2 standard deviations from the mean pixel grayscale. Thus, to make the current frame more clear, the pixels that fall within the +/−2 standard deviations of the mean pixel grayscale are enhanced to occupy more dynamic range in the output. Specifically, the three segments of the relationship 422 can be established by the mean and standard deviation pixel grayscale values described above. Furthermore, the 3-segment function comprises two bounding lines that limit the slopes of the segments 1-3 in the relationship 422, the bounding lines having slopes of contrast maximum ($C_{max}$) and contrast minimum ($C_{min}$) values, corresponding to the contrast limit.

As shown, the relationship 422 between the input frame features and output frame features has three segments with different slopes. By calculating the mean and standard deviation of the intensities (or grayscale) of the input frame features, as described herein, the controller 104 can identify a range of intensities in which a majority of the input frame features fall. In order to make the frame that includes the input features clearer and improve contrast, etc., in the frame, the pixels that fall within the majority range are made to occupy more dynamic range, corresponding to segment 2 (which will occupy more dynamic range) in the relationship 422. This is reflected by the segment 2 having a greater slope as compared to the slopes of segments 1 and 3. A contrast limit having maximum and minimum values may limit maximum and minimum slopes for the relationship 422. The contrast limit may limit, for example, the tone mapping function or other frame enhancement algorithms.

Segments 1 and 3 represent regions where dynamic range will be sacrificed to trade for gain in segment 2. The maximum slope of the segment 2 is limited by the $C_{max}$ slope, and the minimum slopes of the segments 1 and 3 are limited by the $C_{min}$ slope. Thus, the slopes of segments 1-3 cannot exceed the $C_{max}$ and $C_{min}$ slopes, such that the slope of segment 2 cannot be steeper than the slope of the $C_{max}$ slope and the slopes of segments 1 and 3 cannot be shallower than the slope of the $C_{min}$ slope. The enhancement parameters generated here (such as the enhancement parameters 215) will be attenuated to meet the $C_{max}$ and $C_{min}$ limits.

Example Method of Capturing, Enhancing, and Displaying Images in Real-Time

Figure 5:
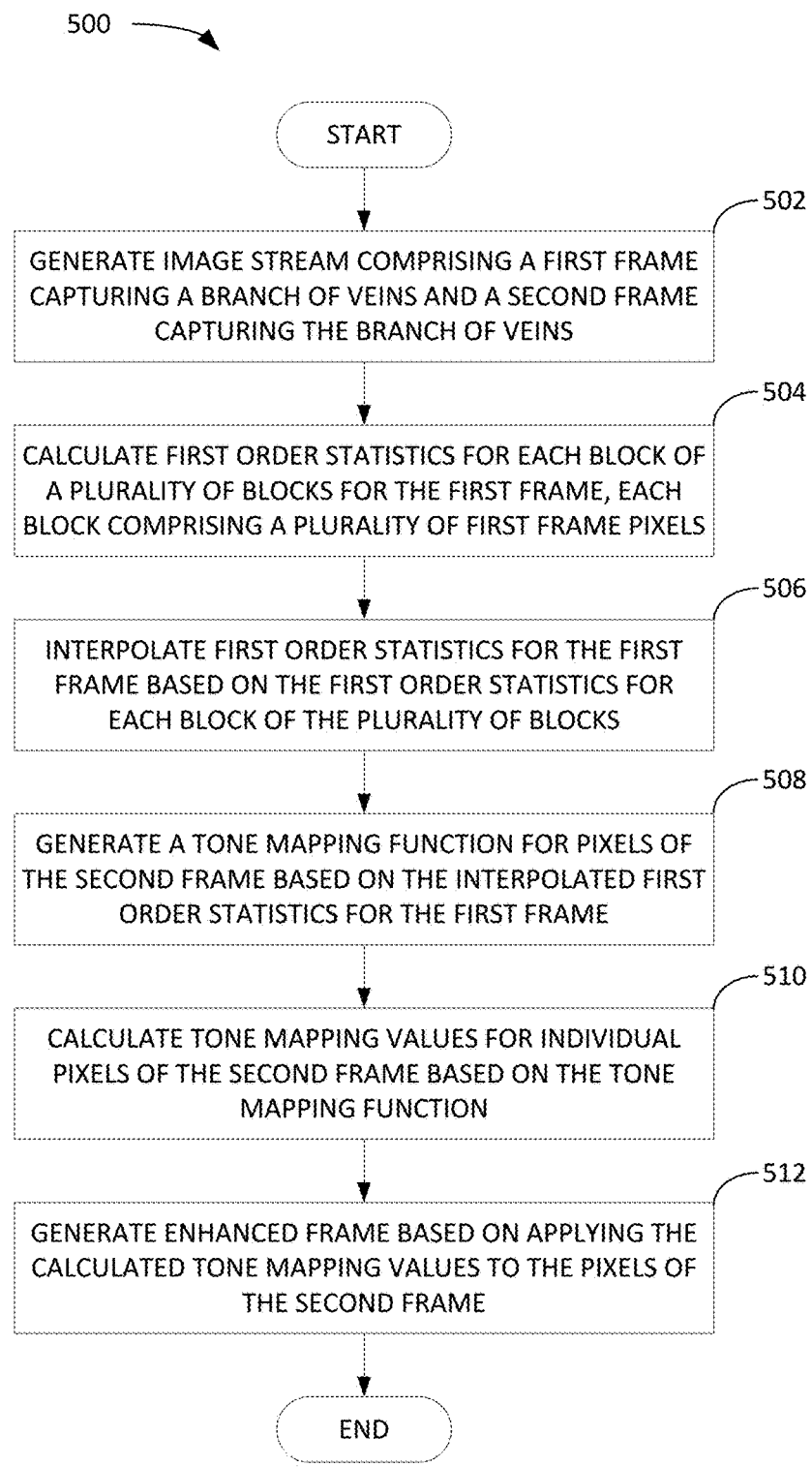
FIG. 5 depicts a method for enhancing frame data used to support a surgical procedure, according to certain aspects of the present disclosure.

FIG. 5 depicts a method 500 for generating, enhancing, and displaying frames of an image stream of a patient's eye for use during a surgical procedure, according to embodiments of the present disclosure. For example, the method 500 may be performed by one or more components of the system 100 of FIG. 1, such as the imaging device 102, the controller 104, and so forth.

Block 502 of the method 500 comprises generating an image stream comprising a first frame capturing a branch of veins in an eye of a patient and a second frame capturing the branch of veins in the eye, the second frame following the first frame in the image stream. In some embodiments, the first and second frames are sequential frames in the image stream, though the first and second frames may also be separated by one or more other frames in the image stream.

Block 504 of the method 500 comprises calculating first order statistics for each block of a plurality of blocks for the first frame, each block of the plurality of blocks for the first frame comprising a plurality of first frame pixels. In some embodiments, the first order statistics correspond to the mean pixel grayscale or intensity and the standard deviation of pixel grayscale or intensity described above, though they first order statistics could correspond to other enhancement parameters. In some embodiments, calculating the first order statistics for blocks of the first frame comprises dividing the first frame into a number blocks and processing the blocks to generate the enhancement parameters and corresponding first order statistics.

Block 506 comprises interpolating first order statistics for the first frame based on the calculated first order statistics for each block of the plurality of blocks for the first frame. The first order statistics for the first frame may be based, at least in part, on the branch of veins. This may comprise the controller 104 generating the enhancement parameters for the first frame based on the enhancement parameters for the blocks making up the first frame.

Block 508 comprises generating a tone mapping function (such as the tone mapping function 230), or similar enhancement function, for pixels of the second frame based on the interpolated first order statistics for the first frame. The tone mapping function, as described herein, may allow the controller 104 to apply the enhancement parameters of the first frame to pixels of the second frame. As introduced above, the tone mapping function may enable the controller 104 to map a first set of colors or values, such as the first order statistics introduced above, to different colors or values. Thus, where the first order statistics of the mean pixel grayscale and the standard deviation grayscale are for the first frame, the tone mapping function may enable mapping of those grayscale values to corresponding values for the second frame.

Block 510 comprises calculating tone mapping values for individual pixels of the second frame based on the tone mapping function and the corresponding enhancement parameters of the first frame.

Block 512 comprises generating an enhanced frame based on application of the calculated tone mapping values for individual pixels of the second frame to the pixels of the second frame.

In some embodiments, the method 500 further comprises calculating first order statistics for each block of a plurality of blocks for a third image, each block of the plurality of blocks for the third frame comprising a plurality of third frame pixels. In some embodiments, the method 500 also comprises interpolating first order statistics for the third frame based on the calculated first order statistics for each block of the plurality of blocks for the third frame. The method 500 also generates first weighted statistics for the first frame based on application of a first weight to the interpolated first order statistics for the first frame and generates second weighted statistics for the third frame based on application of a second weight to the interpolated first order statistics for the third frame, the second weight being less than the first weight. In certain embodiments, generating a tone mapping function for pixels of the second frame based on the interpolated first order statistics for the first frame comprises the image processor configured to generate the tone mapping function for the pixels of the second frame based on the first weighted statistics and the second weighted statistics.

In some embodiments, the method 500 comprises identifying a static object based on detection of the static object at a first location in the first frame and detection of the static object at a corresponding location in the third frame. In some embodiments, the method further comprises identifying a non-static object based on detection of the non-static object in only one of the first frame and the third frame or based on detection of the non-static object at a first location in the first frame and a second location different from the first location in the third frame. In some embodiments, the first order statistics for the first frame comprise a mean pixel intensity for each block of the plurality of blocks for the first frame and an intensity standard deviation for each block of the plurality of blocks for the first frame.

In some embodiments, the method 500 also comprises dividing the first frame into the plurality of blocks. In some embodiments, each block of the plurality of blocks has a same size and shape and is evenly spaced through the first frame relative to other blocks of the plurality of blocks. In some embodiments, the method further comprises identifying a portion of the first frame that comprises space void of relevant aspects of the object and preventing any blocks of the plurality of blocks from being placed in the portion that comprises a white (or black or empty) space. In the method 500, the first order statistics may correspond to a luminance channel of the first frame and the tone mapping function and the tone mapping values apply to a luminance channel of the second frame.

In some embodiments, the first order statistics correspond to a grayscale channel obtained from green pixels of the first frame and the tone mapping function and the tone mapping values apply to a grayscale channel from green pixels of the second frame. In some embodiments, the image capture component comprises a high dynamic range (HDR) camera. In some embodiments, the imaging device comprises an ophthalmic imaging instrument and the object comprises a patient's eye, or a portion thereof. In some embodiments, the tone mapping function is limited based on a contrast limit determined based on the first frame and the contrast limit comprises a maximum contrast value and a minimum contrast value.

The method 500 may further comprise calculating the first order statistics for each block of the plurality of blocks for the first frame based on a mean pixel intensity for each adjacent block adjacent to the block and an intensity standard deviation for each adjacent block adjacent to the block. In some embodiments, each non-edge block of the plurality of blocks comprises four adjacent blocks, each edge block of the plurality of blocks comprises at least one duplicated block along an edge of the frame to create four adjacent neighbor blocks, and the mean pixel intensity and the intensity standard deviation for each duplicated block of the at least one duplicated block are duplicated from an adjacent block along an opposite edge of the edge block from the duplicated block.

Example Processing System

Figure 6:
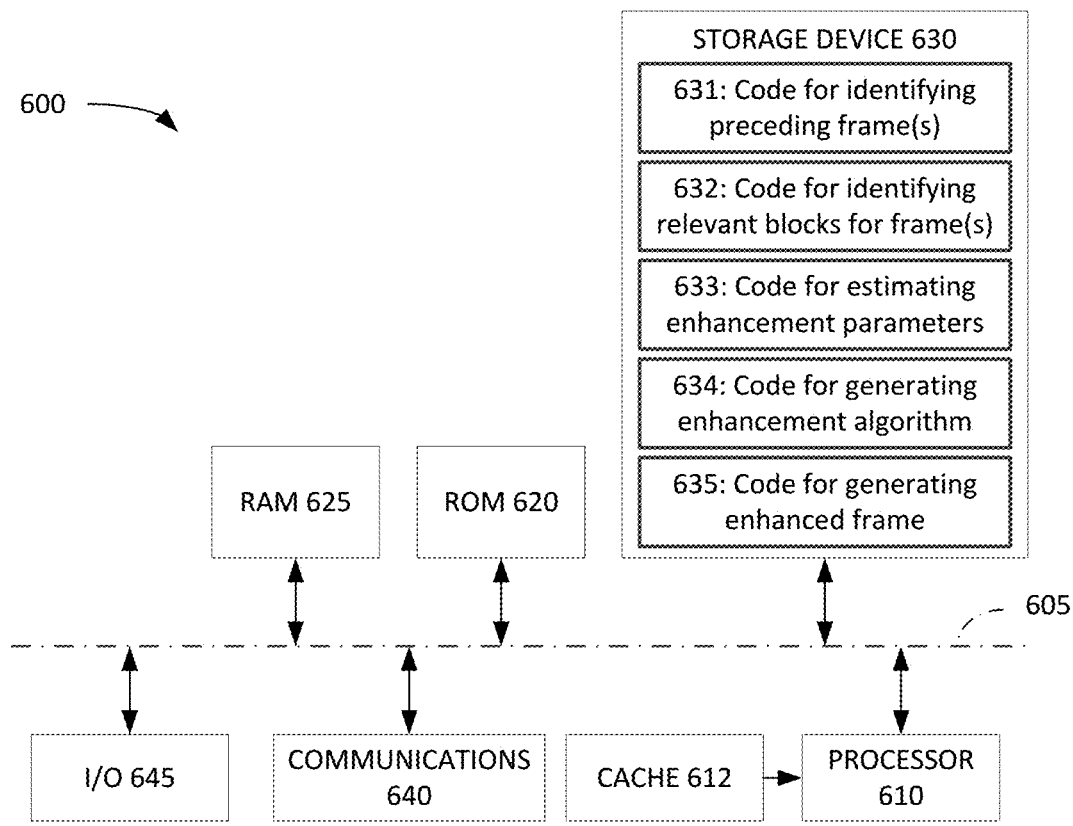
FIG. 6 depicts an example processing system that performs or embodies certain aspects described herein.

FIG. 6 is a diagram of an embodiment of a computing system 600 that may be representative of one or more of the imaging device 102, the controller 104, and the like that performs or embodies certain aspects described herein. Specifically, the computing system 600 may be configured to perform processing or methods illustrated with respect to one or more of the system 100, the data flows 200, 255, and 260, the sequence diagram 300, and the method 500.

FIG. 6 illustrates a computing system 600 where the components of the system 600 are in electronic communication with each other, for example, via a system bus 605. The bus 605 couples a processor 610 to various memory components, such as a read only memory (ROM) 620, a random access memory (RAM) 625, and the like (e.g., PROM, EPROM, FLASH-EPROM, and/or any other memory chip or cartridge). The system 600 may further include a cache 612 of high-speed memory connected to, in close proximity to, or integrated with the processor 610. In some embodiments, the system 600 may access data stored in the ROM 620, the RAM 625, and/or one or more storage devices 630 through the cache 612 for high-speed access by the processor 610. The preceding frames in the image stream that (or the corresponding enhancement parameters) in the image stream that are used to enhance a subsequent frame may be stored in the cache 612

In some embodiments, the one or more storage devices 630 store software modules, such as software modules 631, 632, 633, 634, 635, and the like. When executed by the processor, the software modules 631, 632, 633, 634, and 635 cause the processor 610 to perform various operations or methods, such as the processes described herein. In some embodiments, one or more of the software modules 631, 632, 633, 634, or 635 includes the ML models or other algorithms described herein.

The software module 631 comprises instructions (for example, in the form of computer-readable code) that program the processor 610 to identifying preceding frame(s) with respect to a current or received frame, such as the frame 112. The software module 632 comprises instructions that program the processor 610 to identify relevant blocks in the preceding frame being processed to generate enhancement parameters, where the relevant blocks include portions of a target subject of interest to, for example, the medical practitioner. The software module 633 comprises instructions that program the processor 610 to estimate enhancement parameters for the preceding frame, as described above. In some embodiments, the software module 633 comprises instructions that program the processor 610 to obtain the enhancement parameters from a memory, such as the cache 612 or another memory.

The software module 634 comprises instructions that program the processor 610 to generate an enhancement algorithm, such as the tone mapping algorithm described above. The software module 635 comprises instructions that program the processor 610 to generate an enhanced frame of the frame received initially based on application of the tone mapping algorithm to the current frame received from the imaging device.

Although the system 600 is shown with only one processor 610, the processor 610 may be representative of one or more central processing units (CPUs), multi-core processors, microprocessors, microcontrollers, digital signal processors (DSPs), field programmable gate arrays (FPGAs), application specific integrated circuits (ASICs), graphics processing units (GPUs), tensor processing units (TPUs), and the like. In some examples, the system 600 may be implemented as a stand-alone subsystem, as a board added to a computing device, as a virtual machine, or as a cloud-based processing machine.

To enable user interaction with the system 600 or communications between systems, the system 600 includes a communication interface 640 and input/output (I/O) devices 645. In some examples, the communication interfaces 640 includes one or more network interfaces, network interface cards, and the like to provide communication according to one or more network or communication bus standards. In some examples, the communication interface 640 includes an interface for communicating with the system 600 via a network. In some examples, the I/O devices 645 may include on or more user interface devices (e.g., graphical user interfaces (e.g., user interface 128), keyboards, pointing/selection devices (e.g., mice, touch pads, scroll wheels, track balls, touch screens, and/or the like), audio devices (e.g., microphones and/or speakers), sensors, actuators, display devices, and the like).

Each of the one or more storage devices 630 may include non-transitory and non-volatile storage such as that provided by a hard disk, an optical medium, a solid-state drive, and the like. In some examples, each of the one or more storage devices 630 is co-located with the system 600 (for example, a local storage device) or remote from the system 600 (for example, a cloud storage device).

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. In addition, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein might be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. In addition, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An ophthalmic imaging device comprising:
    an image capture component configured to generate an image stream comprising a first frame capturing a branch of veins in an eye of a patient and a second frame capturing the branch of veins, the second frame following the first frame in the image stream; and
    an image processor configured to:
        calculate first order statistics for individual blocks of a plurality of blocks for the first frame, each block of the plurality of blocks for the first frame comprising a plurality of first frame pixels;
        interpolate first order statistics for the first frame based on the calculated first order statistics for the individual blocks of the plurality of blocks for the first frame, wherein the first order statistics for the first frame are based, at least in part, on the branch of veins;
        calculate first order statistics for each block of a plurality of blocks for a third frame capturing the branch of veins in the eye, each block of the plurality of blocks for the third frame comprising a plurality of third frame pixels;
        interpolate first order statistics for the third frame based on the calculated first order statistics for each block of the plurality of blocks for the third frame, wherein the first order statistics for the third frame are based, at least in part, on the branch of veins;
        generate first weighted statistics for the first frame based on application of a first weight to the interpolated first order statistics for the first frame;
        generate second weighted statistics for the third frame based on application of a second weight to the interpolated first order statistics for the third frame, the second weight being less than the first weight;
        generate a tone mapping function for pixels of the second frame based on the interpolated first order statistics for the first frame, the tone mapping function for the pixels of the second frame based on the first weighted statistics and the second weighted statistics;
        calculate tone mapping values for individual pixels of the second frame based on the tone mapping function; and
        generate an enhanced frame based on application of the calculated tone mapping values for individual pixels of the second frame to the pixels of the second frame.

2. The ophthalmic imaging device of claim 1, wherein the image processor is further configured to: identify a static object based on detection of the static object at a first location in the first frame and detection of the static object at a corresponding location in the third frame.

3. The ophthalmic imaging device of claim 1, wherein the image processor is further configured to identify a non-static object based on detection of the non-static object in only one of the first frame and the third frame or based on detection of the non-static object at a first location in the first frame and a second location different from the first location in the third frame.

4. The ophthalmic imaging device of claim 1, wherein the first order statistics for the first frame comprise:
    a mean pixel intensity for each block of the plurality of blocks for the first frame; and
    an intensity standard deviation for each block of the plurality of blocks for the first frame.

5. The ophthalmic imaging device of claim 1, wherein the image processor is further configured to divide the first frame into the plurality of blocks.

6. The ophthalmic imaging device of claim 1, wherein each block of the plurality of blocks has a same size and shape and is evenly spaced through the first frame relative to other blocks of the plurality of blocks.

7. The ophthalmic imaging device of claim 6, wherein the image processor is further configured to:
    identify a portion of the first frame that comprises space void of relevant aspects of the eye; and
    prevent any blocks of the plurality of blocks from being placed in the portion that comprises a white space.

8. The ophthalmic imaging device of claim 1, wherein:
    the first order statistics correspond to a luminance channel of the first frame, and
    the tone mapping function and the tone mapping values apply to a luminance channel of the second frame.

9. The ophthalmic imaging device of claim 1, wherein:
    the first order statistics correspond to a grayscale channel obtained from green pixels of the first frame, and
    the tone mapping function and the tone mapping values apply to a grayscale channel from green pixels of the second frame.

10. The ophthalmic imaging device of claim 1, wherein the image capture component comprises a high dynamic range (HDR) camera.

11. The ophthalmic imaging device of claim 1, wherein:
    the tone mapping function is limited based on a contrast limit determined based on the first frame, and
    the contrast limit comprises a maximum contrast value and a minimum contrast value.

12. A ophthalmic image processing method, comprising:
    generating an image stream comprising a first frame capturing a branch of veins in an eye of a patient and a second frame capturing the branch of veins in the eye, the second frame following the first frame in the image stream;
    calculating first order statistics for individual blocks of a plurality of blocks for the first frame, the individual blocks of the plurality of blocks for the first frame comprising a plurality of first frame pixels;

interpolating first order statistics for the first frame based on the calculated first order statistics for the individual blocks of the plurality of blocks for the first frame, wherein the first order statistics for the first frame are based, at least in part, on the branch of veins;

calculating first order statistics for each block of a plurality of blocks for a third frame capturing the branch of veins in the eye, each block of the plurality of blocks for the third frame comprising a plurality of third frame pixels;

interpolating first order statistics for the third frame based on the calculated first order statistics for each block of the plurality of blocks for the third frame, wherein the first order statistics for the third frame are based, at least in part, on the branch of veins;

generating first weighted statistics for the first frame based on application of a first weight to the interpolated first order statistics for the first frame;

generating second weighted statistics for the third frame based on application of a second weight to the interpolated first order statistics for the third frame, the second weight being less than the first weight;

generating a tone mapping function for pixels of the second frame based on the interpolated first order statistics for the first frame, the tone mapping function for the pixels of the second frame based on the first weighted statistics and the second weighted statistics;

calculating tone mapping values for individual pixels of the second frame based on the tone mapping function; and generating an enhanced frame based on application of the calculated tone mapping values for individual pixels of the second frame to the pixels of the second frame.

13. The ophthalmic image processing method of claim 12, further comprising:

identifying a static object based on detection of the static object at a first location in the first frame and detection of the static object at a corresponding location in the third frame, and identifying a non-static object based on detection of the non-static object in only one of the first frame and the third frame or based on detection of the non-static object at a first location in the first frame and a second location different from the first location in the third frame.

14. The ophthalmic image processing method of claim 12, wherein the first order statistics for the first frame comprise:

a mean pixel intensity for each block of the plurality of blocks for the first frame; and an intensity standard deviation for each block of the plurality of blocks for the first frame.

15. An ophthalmic imaging device comprising:

an image capture component configured to generate an image stream comprising a first frame capturing a branch of veins in an eye of a patient and a second frame capturing the branch of veins, the second frame following the first frame in the image stream; and an image processor configured to:

calculate first order statistics for each block of a plurality of blocks for the first frame, each block of the plurality of blocks for the first frame comprising a plurality of first frame pixels, the calculation based on a mean pixel intensity for each adjacent block adjacent to the block and an intensity standard deviation for each adjacent block adjacent to the block;

interpolate first order statistics for the first frame based on the calculated first order statistics for the each block of the plurality of blocks for the first frame, wherein the first order statistics for the first frame are based, at least in part, on the branch of veins;

generate a tone mapping function for pixels of the second frame based on the interpolated first order statistics for the first frame;

calculate tone mapping values for individual pixels of the second frame based on the tone mapping function; and generate an enhanced frame based on application of the calculated tone mapping values for individual pixels of the second frame to the pixels of the second frame.

16. The ophthalmic imaging device of claim 15, wherein each non-edge block of the plurality of blocks comprises four adjacent blocks;

each edge block of the plurality of blocks comprises at least one duplicated block along an edge of the first frame to create four adjacent neighbor blocks; and the mean pixel intensity and the intensity standard deviation for each duplicated block of the at least one duplicated block are duplicated from an adjacent block along an opposite edge of the edge block from the duplicated block.

* * * * *